Patented Apr. 24, 1945

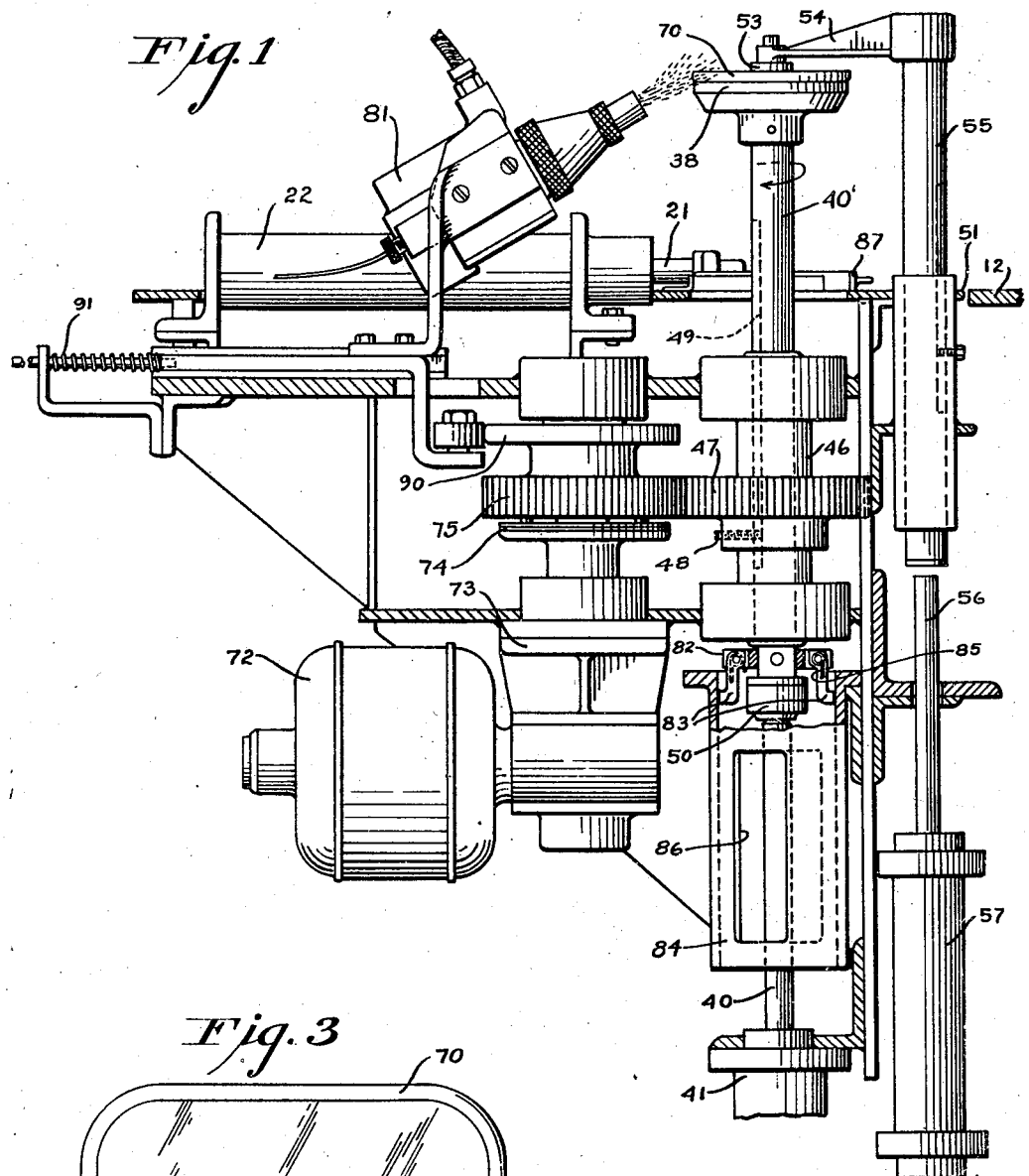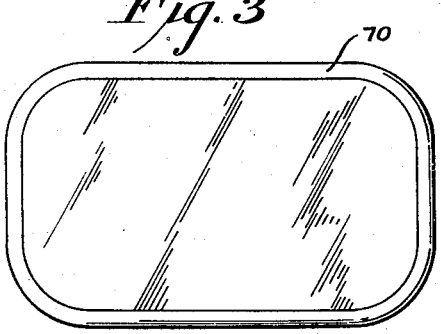

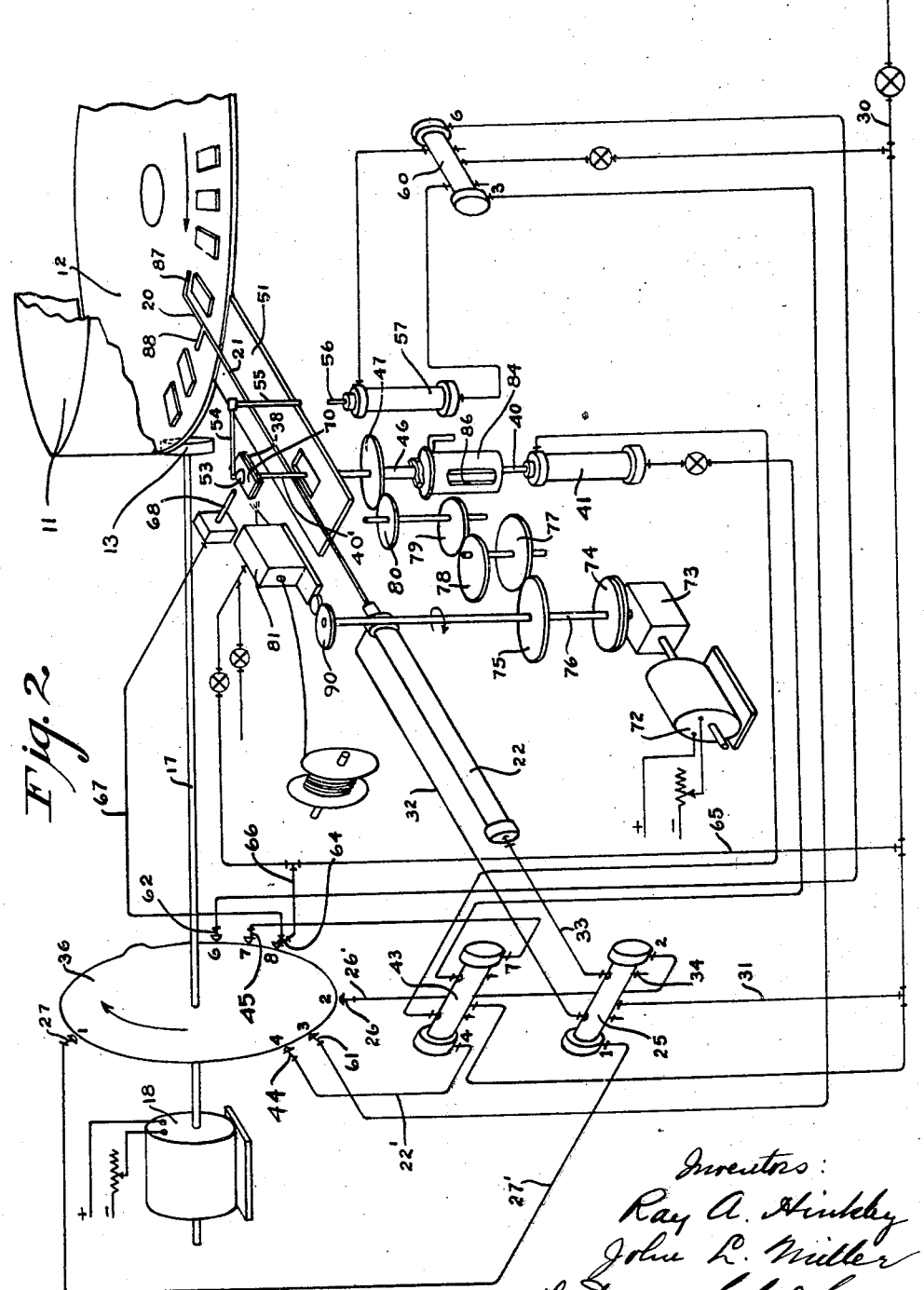

2,374,288

UNITED STATES PATENT OFFICE 2,374,288

METHOD OF COATING ARTICLES

Ray A. Hinkley and John Leland Miller, Corning, N. Y., assignors to Corning Glass Works, Corning, N. Y., a corporation of New York Original application May 17, 1939, Serial No. 274,290. Divided and this application March 31, 1941, Serial No. 386,188

4 Claims. (Cl. 117—104)

This application is a division of Hinkley et al. application Serial Number 274,290, filed May 17, 1939.

The present invention relates to the metallizing of glass articles by heating them in known fashion and then spraying the surfaces thereof to be metallized by presenting such surfaces to a Schoop gun or other metal spray apparatus. By this method the metal is applied in atomized form and good adhesion to the glass is obtained so long as the glass is sufficiently hot and the thickness of the coating is held within reasonable limits beyond which the coating will tend to spall. The application of a coating to the outer edge surfaces of a circular article can be readily accomplished by simply appropriately spacing it from the nozzle of a Schoop gun and rotating the article while spraying its edge surface until the desired thickness of coating has been applied. Since in such an article the surface thereof being coated may readily be passed before the gun at a constant speed and remains uniformly spaced therefrom at all times, a uniformly distributed coating is obtained without difficulty. If, on the other hand, the article surface to be coated is of non-circular outline, its surface speed and distance from the gun nozzle will vary and an uneven distribution of the coating material will result.

One object of the present invention is a process by which glass objects even though of non-circular outline may be given a uniform coating in a highly efficient manner.

The present invention embodies among its features facilities for feeding an article to a reheating lehr, transferring the heated article therefrom to a rotatable support, elevating, seizing, and rotating the article in such a manner as to present a constantly changing uniform surface area thereof to be coated to a Schoop gun ejecting a spray of coating material, effecting such movement of the gun as to maintain a uniform distance between it and the surface being coated, and to thereafter release and pneumatically unload the article from the support.

Fig. 1 of the accompanying drawings illustrates, in side elevation and partly in section, a preferred form of part of an apparatus embodying the invention;

Fig. 2 is a diagrammatic view of the apparatus shown in Fig. 1 and of other apparatus cooperative therewith; and Fig. 3 is an enlarged plan view of one of the articles to be coated.

The apparatus employed in heating the articles to be coated comprises a circular tunnel lehr 11 having a ware support comprising a table 12 diagrammatically illustrated as being rotatable by a friction wheel 13 supported on a shaft 17 driven by a variable speed motor 18.

The feeding of an article to the lehr table and the withdrawal of a heated article therefrom is by means of a rake 20 carried on the free end of a shaft 21 actuated by a piston within a pneumatic cylinder 22. A control valve 25 under the influence of a pair of bleeder valves 26 and 27 alternately supplies air to the opposite ends of the cylinder 22 to effect such actuations.

These bleeder and control valves and others hereinafter referred to are of well known form and are similar to those disclosed in a copending Goodrich application Serial Number 227,551, filed August 30, 1938. All control valves are continuously supplied with air from a main supply line 30 and in turn have leakage paths within them which supply air to lines extending to their respective bleeder valves. For example, valve 25 receives air via line 30 and a branch line 31 and feeds a part of this air out over bleeder valve lines 26' and 27' which are normally closed to atmosphere by their bleeder valves 26 and 27. When bleeder valve 26 is actuated, it exhausts line 26' direct to atmosphere causing the control valve to actuate and supply air to the forward end of cylinder 22 via an air line 32 and at the same time exhausts the rearward end of the cylinder to atmosphere via a line 33, ports within the valve and an exhaust line 34. In a similar fashion the actuation of bleeder valve 27 causes the valve 25 to operate in such a manner as to supply air over line 33 to the rearward end of cylinder 22 and to exhaust the forward end thereof to atmosphere. As will readily appear from an inspection of Fig. 2, the bleeder valves 26 and 27 with others, hereinafter specifically referred to, are arranged in the desired order and spaced relation about a timer cam 36 supported on shaft 17 and having a single lobe for successively actuating the bleeder valves.

The elevating and subsequent lowering of an article is by means of a support 38 carried by a shaft 40' coupled by a ball bearing assembly 50 to a shaft 40, adapted to be raised and lowered by a piston within a pneumatic cylinder 41. A control valve 43 under the influence of a pair of bleeder valves 44 and 45 alternately supplies air to the opposite ends of cylinder 41 to effect such actuations. The shaft 40' passes through a sleeve 46 carrying a gear 47 into the hub of which is threaded set screw 48 (Fig. 1) entering a slot 49 in the shaft. This arrangement provides a drive connection between the shaft 40' and gear 47 while permitting sufficient relative endwise movement that when air is supplied to the upper end of cylinder 41 the support 38 is lowered flush with a stationary platform 51 extending over to the edge of the rotating table 12 from which a heated article is raked onto the support in a manner hereinafter explained.

The clamping of an article on support 38 during the rotation thereof is by a clamping cup 53 rotatably mounted on an arm 54 supported from a shaft 55 at times under the influence of a shaft 56 actuated by a piston within a pneumatic cylinder 57. A control valve 60 under the influence of a pair of bleeder valves 61 and 62 alternately supplies air to the opposite ends of cylinder 57 as required to raise and lower its shaft 56.

The unloading of an article from support 38 is effected by a bleeder valve 64 which, when actuated, exhausts air from its feed lines 65 and 66 to atmosphere through a line 67 and an unloading nozzle 68.

The invention is herein applied to the coating of the edge surfaces of rectangular glass articles 70 having their corners rounded, as clearly illustrated in Fig. 3. Since it so happens that the surface to be coated is of substantially rectangular outline, the surface speed variations of one-half thereof, comprising an end and half of each adjoining side of the article, will duplicate that of the opposite half of the article. Because of this, the same means can be employed twice during one revolution of the article to appropriately vary the speed of the article supporting shaft 40' in like manner twice during one revolution thereof. Rotation of shaft 40' is by a motor 72 through a suitable reduction gearing 73, a friction clutch 74, a gear 75 carried by an associated vertical shaft 76, a pinion 77, eccentrically mounted gears 78 and 79, and a gear 80 in mesh with the gear 47 on shaft 40'. The foregoing gears are all one to one ratio excepting gears 80 and 47, which are one to two ratio. It follows, therefore, that for each revolution of shaft 76 shaft 40' revolves one-half revolution during which its speed of rotation is varied in accordance with the eccentricity of gears 78 and 79, and that one-half of the edge surface of an article 70 to be coated is rotated in front of the nozzle of a Schoop gun 81 at a substantially constant peripheral speed. The other half of the edge surface to be coated is in a similar fashion advanced in front of the Schoop gun during the second revolution of the eccentric gears.

It is essential to stop rotation of the article support when loading and unloading and further to insure its being brought to a stop in properly oriented rotary position to properly receive the article. This is accomplished by providing the lower end of shaft 40' with a collar 82 (Fig. 1) carrying dogs 83 extending into a stationary cylinder 84 and urged outward by springs 85. When the shaft 40' is lowered a predetermined extent these dogs move outward into appropriate slots 86 in the cylinder thereby stopping rotation of the shaft. The parts are so proportioned that this occurs as soon as the article has been lowered clear of the field of the spray material and into alignment with the pneumatic discharge nozzle 68. While the shaft 40' is prevented from rotating, the entire gear train is held stationary. The slipping of clutch 74, however, permits continued operation of the motor 72 during the time rotation of the respective parts is being prevented.

As previously mentioned, the apparatus for introducing articles into the lehr and for withdrawing articles therefrom comprises a rake 20 carried on the free end of a shaft 21, actuated by a piston within the pneumatic cylinder 22. This rake has a prong 87 which rakes a heated article from the lehr table 12 onto support 38 at a time that such support is stationary and flush with an associated platform 51. To keep the lehr continuously supplied with articles, an attendant at this time places an article on platform 51 in front of a prong 88 of the rake so that as it returns to the position shown it rakes such article onto the rotating table of the lehr.

As soon as an article is oriented on support 38, the lobe of timer cam 36 encounters and actuates the bleeder valve 45 under the influence of which control valve 43 is actuated to supply air to the lower end of cylinder 41 to elevate the support 38 as required to bring the article carried thereon into position to receive a deposit from the Schoop gun 81. However, before this height of the platform is attained, the clamp-down cup 53 is encountered. The weight of the supporting arm 54 and vertically movable shaft 55 of this cup prevents displacement of the article therefrom on subsequent rotation thereof following the raising of the dogs 83 clear of the slots 86 in cylinder 84.

As previously stated, shaft 55 is at times under the influence of a shaft 56 having a piston operating in a cylinder 57 to which air is supplied by the control valve 60 under the influence of bleeder valves 61 and 62. While an article is being coated, bleeder valve 62 is encountered by lobe of cam 36 and causes valve 60 to supply air to the lower end of cylinder 57, thereby bringing the free end of shaft 56 to such elevation that subsequently as the sprayed article is lowered, consequent to engagement of bleeder valve 45 by the timer cam, and locked against further rotation, shaft 55 encounters shaft 56 as the sprayed article approaches the horizontal level of nozzle 68. Accordingly, as shaft 45 is lowered slightly farther, the article is freed from the clamp 53. Just before this occurs, however, the lobe of the timer cam encounters bleeder valve 64 which bleeds air supplied to it by line 66 through line 67 and the nozzle 68. Accordingly, as the sprayed article is lowered to the level of the nozzle it is freed from cup 53 and blown from support 38 onto a suitable conveyor (not shown).

In the period during which the support is flush with platform 51, in preparation for the receipt of another article, bleeder valve 61 is actuated and causes the control valve 60 to supply air to the upper end of cylinder 57, thereby positively restoring shaft 56 to its lowermost position. This enables shaft 55 to lower the clamp member 53 to its initial position.

The distance of the Schoop gun from the surface being coated is maintained constant by a suitably shaped cam 90 carried by shaft 76 and a return spring 91. Since the shaft 76 revolves two revolutions to one of the articles to be coated, the outline of the cam 90 is such that during one revolution thereof it effects movement of the gun as required to maintain it a substantially uniform distance from the one end and half of each adjoining side of the article edge surface passing before the gun and on its second revolution in a similar fashion maintains this distance constant during passing of the other half of the article edge surface before the gun.

In order to prevent the upper and lower surfaces of the article being sprayed from receiving stray particles of the coating material, the gun 81 is positioned to direct the spray from a level below the top surface of the article support 38. With the material striking the edge of the article from a level below the plane of the lower surface of the article, the tendency to blow the material between the support and article is avoided; also, the material ejected above the top surface of the article does not disfigure it, as such material moves at high velocity and accordingly passes thereover.

Although the invention has herein been applied to an apparatus for coating the peripheral edges of a non-circular article of a particular configuration, it should be understood that by suitable modification of the eccentricity of gears 78 and 79 and of the shapes of cam 90 and support 38, such apparatus may be readily adapted to coat the peripheral edges of any other of a wide range of symmetrically shaped articles without departing from the spirit and scope of the invention.

What is claimed is:

1. The method of coating the peripheral surfaces of an article in which such surfaces are different distances from its axial center, which includes rotating the article about such center at the varied speeds necessary to establish a substantially constant peripheral surface speed thereof, directing a spray of coating material toward the peripheral surface of the article and shifting the root of the spray as necessary to maintain it a constant distance from the periphery of the article.

2. The method of coating surfaces of an article of non-circular outline, which includes directing a spray of coating material to a minor portion of the surface to be coated, effecting relative rotation between the article and the root of the spray, about an axis passing through the article, at varying speeds required to progressively present all surfaces of the article to be coated to the spray for substantially the same period of time and at the same time shifting the root of the spray as required to maintain a substantially uniform space relationship between the article and the root of the spray at all times.

3. The method of applying an non-circular band of coating material to an article, which includes directing a spray of coating material against a portion of the article while effecting relative rotary movement between the article and the root of the spray, about an axis passing through the article, at varying speeds inversely proportional to the distance of the surface to be coated from the axis of rotation and shifting the root of the spray as required to maintain it in substantially the same position relative to the surface of the article being coated throughout the coating cycle.

4. The method of applying a non-circular band of coating material to an article, which includes directing a spray of coating material against a portion of the article while effecting relative rotary movement between the article and the root of the spray, about an axis passing through the article, at varying speeds inversely proportional to the distance of the surface to be coated from the axis of rotation and shifting the root of the spray to maintain the space relationship between the surface being coated and the root of the spray substantially constant throughout the coating cycle.

RAY A. HINKLEY.
JOHN LELAND MILLER.